United States Patent
Recio et al.

(10) Patent No.: US 7,215,112 B1
(45) Date of Patent: May 8, 2007

(54) NON-CONTACT LINEAR ABSOLUTE POSITION SENSOR

(75) Inventors: Mario A. Recio, Chihuahua (MX); Arquimedes Godoy, Chihuahua (MX); Daniel A. Martinez, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/268,068

(22) Filed: Nov. 7, 2005

(51) Int. Cl.
*G01B 7/14* (2006.01)
*G01B 7/30* (2006.01)

(52) U.S. Cl. ............... 324/207.2; 324/207.11; 324/207.13; 324/207.24; 341/13; 341/15

(58) Field of Classification Search ............ 324/207.2, 324/207.24; 341/16
See application file for complete search history.

(56) References Cited

U.S. PATENT DOCUMENTS

| | | | |
|---|---|---|---|
| 5,029,304 A * | 7/1991 | Tolmie, Jr. | 341/15 |
| 6,060,880 A * | 5/2000 | Guyot et al. | 324/207.2 |
| 6,175,233 B1 * | 1/2001 | McCurley et al. | 324/207.2 |
| 6,211,668 B1 * | 4/2001 | Duesler et al. | 324/207.2 |
| 6,469,497 B2 | 10/2002 | Schroeder | |
| 6,515,471 B1 * | 2/2003 | Santos | 324/207.2 |
| 6,519,549 B1 | 2/2003 | Lin et al. | |
| 6,577,123 B2 | 6/2003 | Schroeder et al. | |
| 6,697,680 B2 | 2/2004 | Lin et al. | |
| 6,992,478 B2 * | 1/2006 | Etherington et al. | 324/207.2 |
| 2004/0164727 A1 | 8/2004 | Lin | |
| 2004/0189283 A1 | 9/2004 | Godoy et al. | |
| 2005/0030009 A1 | 2/2005 | Moreno | |
| 2005/0088667 A1 | 4/2005 | Yeo | |
| 2005/0258822 A1 * | 11/2005 | Hara et al. | 324/207.2 |

* cited by examiner

*Primary Examiner*—Khai M. Nguyen
(74) *Attorney, Agent, or Firm*—Paul L. Marshall

(57) ABSTRACT

A non-contact linear absolute position sensor includes a first magnetic encoder having n+1 pole pairs, a second magnetic encoder having n pole pairs and located and aligned with the first magnetic encoder so as to cover a linear distance. The magnetic encoders are affixed to a traveling body. Two pairs of Hall Effect sensors are located near each of the first and second magnetic encoders and are configured to generate linear position signals. A processor is provided to process the linear position signals to generate an output signal indicative of a linear absolute position of the traveling body.

8 Claims, 5 Drawing Sheets

NON-CONTACT LINEAR ABSOLUTE POSITION SENSOR

BACKGROUND OF THE INVENTION

1. Technical Field

The present invention relates generally to position sensors, and, more particularly, to a non-contact linear absolute position sensor.

2. Description of the Related Art

Angular and linear position sensors are widely used in automatic control systems as feedback-sensing devices in one or more control loops of the system. In the automotive industry, such position information may be used in substitution of more traditional, conventional control feedback provided by mechanical linkages, such as cables, rods, and the like.

For example, in the automotive field, it may be desirable to know the linear absolute position of a long travel mechanism, such as a rack and pinion mechanism (i.e., that moves when a driver of an automotive vehicle turns the steering wheel), or the position of a sliding door on a minivan. In the first example, a linear absolute position sensor can provide information as to the absolute linear position of the rack and pinion mechanism, which corresponds to the orientation of the front wheels (i.e., the steering wheels) of the automotive vehicle. In the second example, it may be desirable to know exactly where the sliding door is positioned within the long travel between a completely closed position and a completely open position. There are many other examples in and outside of the automotive industry. Non-contact linear absolute position sensing has conventionally been accomplished using a variety of technologies including inductive, optical, capacitive, and Hall Effect (i.e., magnetic flux intensity).

For example, inductive sensors are mechanically sturdy, but can be influenced by stray or externally-generated electromagnetic fields. Optical-based sensors are generally very accurate but require a relatively high degree of tolerancing on the parts, and are subject to strict sealing requirements in order to prevent or minimize dust from entering into the assembly, which can adversely influence an otherwise accurate measurement. Capacitive-based sensing technology generally provides satisfactory results but for conventional sized sensors the capacitance is generally relatively small and accordingly humidity and/or electromagnetic fields can also greatly influence an otherwise accurate measurement.

It is also known to use Hall Effect sensing technology for measuring absolute linear position, but such conventional approaches generally require very good material properties on the magnet and require flux concentrators made of a low hysteresis material. Additionally, these concentrators often require very accurate dimensioning and positioning. It is also very hard to achieve good temperature compensation using Hall Effect sensors alone. This problem is increased when you have to compensate for a component's position variation due to temperature.

U.S. Patent Application Publication No. 2004/0164727 A1 entitled "SINGLE MAGNET LINEAR POSITION SENSOR" discloses a sensor assembly for measuring linear position that includes a ferromagnetic flux concentrator, a magnet, and a galvanomagnetic sensing element such as a Hall Effect or magnetoresistive sensor.

In view of the foregoing, there is a need to provide a non-contact linear absolute position sensor that minimizes or eliminates one or more of the shortcomings referred to above.

SUMMARY OF THE INVENTION

Generally, the present invention fulfills the foregoing needs by providing, in one aspect thereof, a sensor system for measuring linear absolute position. The system comprises a first magnetic encoder, a second magnetic encoder, first and second magnetic flux intensity sensing units, and a processor. The first and second magnetic encoders have, respectively, n+1 pole pairs, and n pole pairs (where n is an integer greater than or equal to one). Each pole pair includes a north and south magnetic pole combination, as is known. The magnetic encoders are positioned proximate to each other and aligned with respect to each other so as to cover a linear distance. In one embodiment, the magnetic encoders are affixed to a traveling body whose linear absolute position is to be sensed. The first and second magnetic flux intensity sensing units are located next to and in sensing relation with the first and second magnetic encoders, respectively, and are configured to generate respective linear position signals. In one embodiment, the sensing units are fixed relative to the moving magnetic encoders. The linear position signals originating from the first and second sensing units exhibit a phase shift that is proportional to the linear absolute position (e.g., of the traveling body). The processor is responsive to the linear position signals (and thus the phase shift) and is configured to generate an output signal that is indicative of the absolute linear position.

In one embodiment, the first and second sensing units each include a pair of Hall Effect sensors. In each of the sensing units, one of the pair is oriented a pole's distance ahead of the other one of the pair so that each sensing unit produces dual signals 90° apart. This arrangement allows for temperature and target distance variation compensation, among other things. Accordingly, the inventive sensor system will be more robust to (i) variation of a material's magnetic properties, for example, between different lots of magnets, and variation with temperature; (ii) unpredictable target distance change due to temperature; and (iii) unpredictable target distance change due to application specific conditions (wear, pressure, etc.). For example, embodiments according to the invention may be made from plastic, which is characterized by a much less predictable change in dimension due to variation in temperature. The present invention can readily accommodate these uncertainties to provide an accurate output.

BRIEF DESCRIPTION OF THE DRAWINGS

The present invention will now be described by way of example, with reference to the accompanying drawings.

DETAILED DESCRIPTION OF AN EMBODIMENT OF THE INVENTION

Figure 1:
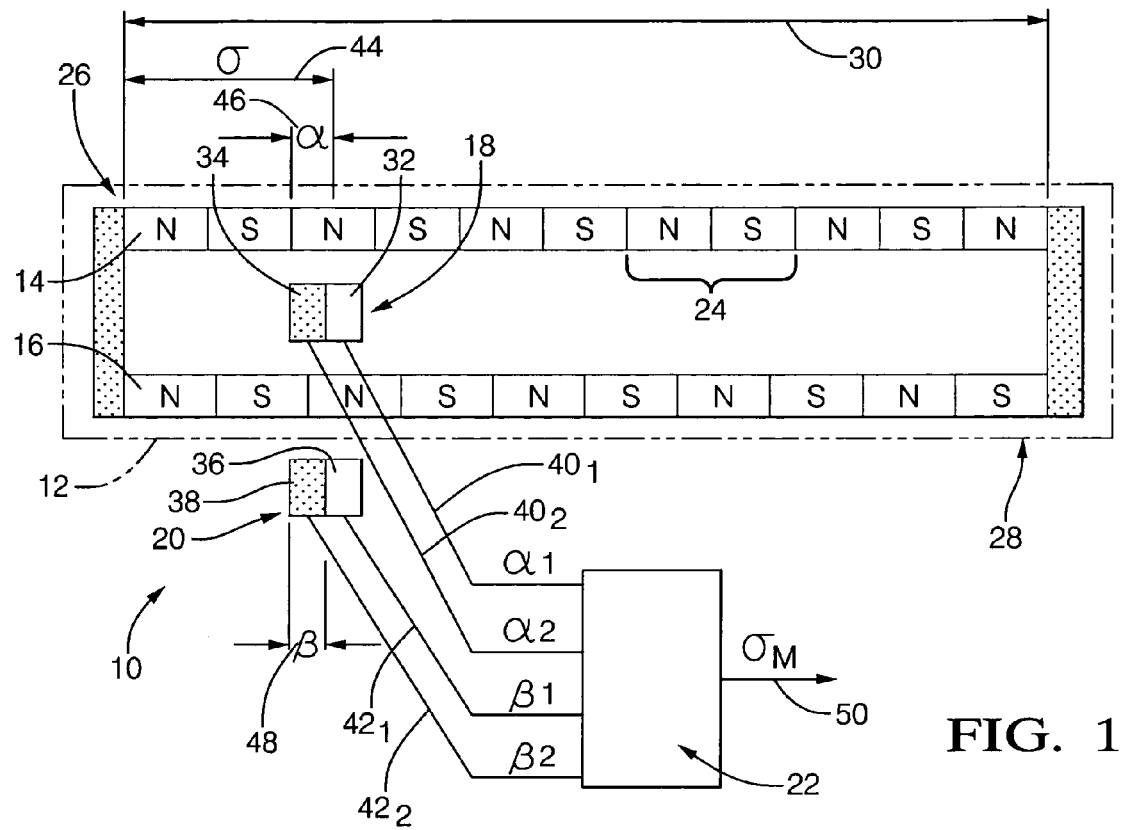
FIG. 1 is a plan view of a first embodiment of a non-contact linear absolute position sensor system including a pair of magnetic encoder tracks, corresponding sensing units and a processor.

Referring now to the figures wherein like reference numerals are used to identify identical components in the various views, FIG. 1 is a schematic and block diagram view of a sensor system 10 in accordance with the present invention. Sensor system 10 is configured to provide an output signal indicative of an absolute linear position of a traveling body, for example, traveling body 12 (shown in phantom line) in FIG. 1.

The present invention provides for a non-contact sensor system, which avoids wear and tear, providing like-new performance even after long use. As will be described in greater detail below, a sensor system according to the invention also provides for accurate absolute linear position measurements even over temperature variations.

As described in the Background, there are many uses for a sensor system according to the invention. Examples include, but are not limited to, those mentioned in the Background, namely measuring long linear travel parts such as a rack and pinion mechanism (e.g., steering) or the position of a sliding door. Exemplary applications are not limited to automotive applications and can be in many different industries as will be appreciated by one of ordinary sill in the art.

Before proceeding to a detailed description of the invention, it should be noted that the present invention has a configuration characterized by at least two low-cost magnetic encoders that share the same support (i.e., on traveling body 12). A pair of sensing units, each one near the face of a respective magnetic encoder, will produce a pair of output signals that will have a phase shift therebetween that is proportional to the position of the encoder strips relative to the sensing units, and thus the absolute linear position. Redundancy and/or increased resolution may be obtained by employing further encoders/sensing units, as will become apparent.

With continued reference to FIG. 1, sensor system 10 includes a first magnetic encoder 14, a second magnetic encoder 16, a first magnetic flux intensity sensing unit 18, a second magnetic flux intensity sensing unit 20 and a processor 22.

First encoder 14 may be provided in the form of a strip (e.g., flexible ferromagnetic materials of a desired thickness and width) and which includes n+1 pole pairs, where n is an integer greater than or equal to one. Each pole pair, as known, includes a "north" and a "south" magnetic pole. Second magnetic encoder 16 is provided with n pole pairs and is positioned proximate the first encoder 14 and aligned therewith at both a first end 26 and at a second, opposing end 28 and extending in a coextensive fashion so as to cover a linear distance 30. Second encoder 16 may also come in the form of a strip as described above.

FIG. 1 further shows the first magnetic flux intensity sensing unit 18 as including a first Hall Effect sensor 32 and a second Hall Effect sensor 34. The second magnetic flux intensity sensing unit 20 includes a third Hall Effect sensor 36 and a fourth Hall Effect sensor 38. The first and second sensing units 18 and 20 are located near and in sensing relation to the first and second magnetic encoders 14 and 16, respectively. The sensing units 18, 20 are configured to generate respective linear position signals. In this regard, the linear position signals originating from sensing unit 18, on the one hand, and those originating from sensing unit 20, on the other hand, are characterized by a phase shift that is proportional to the absolute linear position of the encoding strips 14, 16 relative to the sensing units.

In one embodiment, sensing units 18, 20 and processor 22 are fixed relative to magnetic encoding strips 14, 16 that are attached to and move with the traveling body 12. The absolute linear position is this position of the traveling body 12 relative to the sensing units 18, 20.

More particularly, however, sensing unit 18 produces linear position signals comprising a first alpha linear position signal ($\alpha_1$), designated $40_1$, originating from Hall Effect sensor 32, and a second alpha linear position signal ($\alpha_2$), designated $40_2$, originating from Hall Effect sensor 34. Hall Effect sensor 32 is positioned a predetermined distance from Hall Effect sensor 34. The predetermined distance corresponds to one-half a pole distance taken with respect to the spacing in the corresponding magnetic encoder track 14. This relative orientation between Hall Effect sensor 32 and Hall Effect sensor 34 (i.e., the one half pole spacing) results in the first and second alpha position signals $40_1$ and $40_2$ being offset, one relative to the other, by 90° (i.e., where a full pole pair corresponds to 360°). It should be noted that the relative spacing of one-half a pole distance between Hall Effect sensor 32 and Hall Effect sensor 34 is based on the actual spacing of the pole pairs in the corresponding magnetic encoder 14, which corresponds to n+1 pole pairs. As will be described below, this Hall Effect sensor spacing is different, and slightly smaller, from the spacing between Hall Effect sensors 36 and 38, since the corresponding magnetic encoder track 16 only includes n pole pairs over the same linear distance 30 (i.e., and hence results in a slightly wider magnetic pole pair spacing).

In this regard, sensing unit 20 thus also generates twin signals, a first beta linear position signal ($\beta_1$), designated $42_1$, originating from Hall Effect sensor 36, and a second beta linear position signal ($\beta_2$), designated $42_2$, originating from Hall Effect sensor 38. As with sensing unit 18, sensing unit 20, in a preferred embodiment, is constructed such that Hall Effect sensor 36 is offset from Hall Effect sensor 38 by a predetermined distance. This predetermined distance corresponds to one-half a pole distance taken with respect to the spacing in the corresponding magnetic encoder 16. As alluded to above, magnetic encoder 16, in accordance with the present invention, includes n pole pairs, and hence has slightly larger spacing than the encoder track 14. As a result, first and second beta position signals $42_1$ and $42_2$ are offset, one from another by 90°.

Sensing units 18 and 20 are aligned, and as described above, are fixed relative to the moving encoder tracks 14, 16. In FIG. 1, an absolute linear position 44 (also designated σ) corresponds to the actual, physical absolute linear position of the traveling body 12 relative to the fixed, sensing units 18 and 20. As also shown in FIG. 1, the present invention employs a single angle parameter 46, also designated alpha (α), which indicates the relative position of the sensing unit 18 (alpha sensor) within a pole pair on encoder track 14. In a similar fashion, single angle parameter 48, designated beta (β), indicates the relative position of sensing unit 20 (beta sensor) within a pole pair on magnetic encoder track 16.

With continued reference to FIG. 1, processor 22 is responsive to the linear position signals $40_1$, $40_2$ and $42_1$, $42_2$ and is configured to generate an output signal 50 indicative of a measured absolute linear position ($\sigma_M$) of the traveling body 12. Processor 22 may be implemented using conventional components known to those of ordinary skill in the art (e.g., hardware circuitry or programmed operation of a processor).

Figure 2:
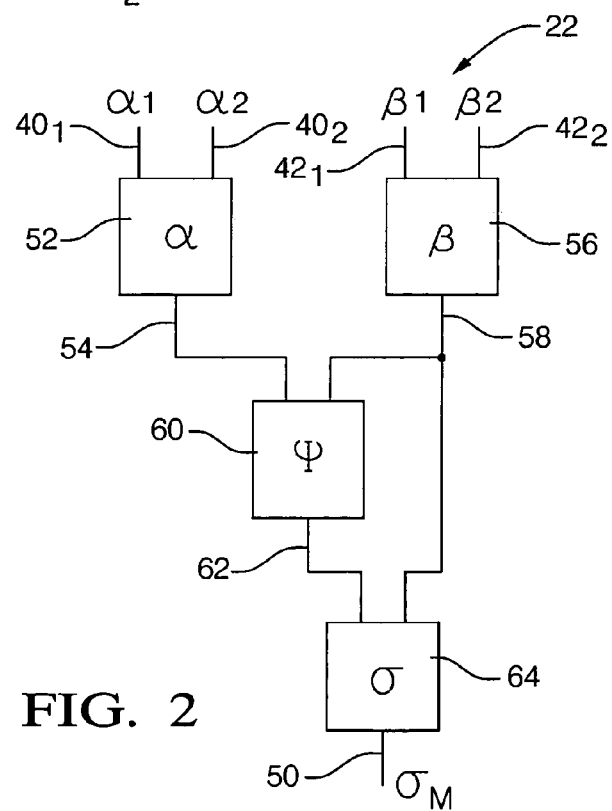
FIG. 2 is a schematic and block diagram view showing, in greater detail, the processor (i.e., method processing block) of FIG. 1.

FIG. 2 is a simplified schematic and block diagram showing, in greater detail, processor 22 of FIG. 1. Processor 22 is configured to implement a method for solving for the distance indicative of the absolute linear position of the traveling body 12. In this regard, block 22 is configured to generate an output signal 50 ($\sigma_M$) indicative of the absolute linear position of the traveling body 12, which absolute position is also designated by reference numeral 44 in FIG. 1. Processor 22 includes a first single-angle determination unit 52 responsive to the alpha position signals $40_1$ and $40_2$ configured to generate a first angle signal 54, a second single-angle determination unit 56 responsive to the beta position signals $42_1$ and $42_2$ configured to generate a second angle signal 58, a dephaser 60 responsive to the first and second angle signals 54, 58 configured to generate a difference signal ($\phi$) 62, and a position generator 64 responsive to the difference signal 62 and the second angle signal 58 and configured to generate the previously mentioned output signal 50 ($\sigma_M$).

First single-angle determination unit 52 is configured to process the alpha linear position signals $40_1$ and $40_2$ to generate a composite, first-angle signal ($\alpha$) 54. In one embodiment, the first angle signal 54 may be defined as a function of $$\alpha = A\ \text{TAN}\ (\alpha_2/\alpha_1)$$

where $\alpha$ is said first angle signal 54,
$\alpha_1$ is said first alpha linear position signal $40_1$,
$\alpha_2$ is said second alpha linear position signal $40_2$, and
wherein ATAN is the arctangent function.

A single Hall Effect sensor may have its output affected by temperature variations. However, the present invention, by using two Hall Effect sensors on the same encoder strip, and then processing both signals, as described above, is operative to minimize or eliminate the variation due to temperature dependence. Any variation of one Hall Effect sensor due to temperature is processed out when the twin signals $40_1$ and $40_2$, each assumed to have a similar temperature based variation, are divided one by the other as described above. This is one advantage to using dual signals originating from dual Hall Effect sensors operating against the same magnetic encoder strip, such as strip 14. Another advantage is that the twin signals can provide position information within a full 360° span of the pole pairs. The first angle signal ($\alpha$) 54 is indicative of the position of the first sensing unit 18 within one of the n+1 pole pairs in the first magnetic encoder 14.

Second single-angle determination unit 56 operates in the same way as determination unit 52 except that it processes the twin beta position signals $42_1$ and $42_2$ originating from the second sensing unit 20. The second angle signal ($\beta$) 58 that is generated from unit 56, in one embodiment, may be defined as a function of $$\beta = A\ \text{TAN}\ (\beta_1/\beta_2)$$

where $\beta$ is said second angle signal 58,
$\beta_1$ is said first beta position signal $42_1$,
$\beta_2$ is said second beta position signal $42_2$, and
wherein ATAN is the arctangent function.

The second angle signal ($\beta$) 58 is indicative of the position of the second sensing unit 20 within one of the n pole pairs in the second magnetic encoder 16.

De-phaser 60 is configured to generate the difference signal 62, which is representative of the difference in phase between $\alpha$ (signal 54) and $\beta$ (signal 58), i.e., it is the phase difference between the two pole pairs calculated above. The phase difference is indicative of absolute linear position. As described above, the position of each sensing unit relative to its corresponding magnetic encoder strip is calculated by first and second determination units 52 and 56 to generate respective single-angle signals 54 and 58 (i.e., in one embodiment, the signal pairs $40_1$ and $40_2$ and, $42_1$ and $42_2$, are de-phased 90°). In order to make an accurate calculation, however, each of the first and second single-angle signals 54 and 58 must first be put into the same scale since each was derived from encoders using (n+1) and (n) pole pairs, respectively. Accordingly, part of the processing in de-phaser 60 includes multiplying the first single-angle signal 54 by (n), and multiplying the second single-angle signal 58 by (n+1). In one embodiment, the de-phaser 60 is configured to generate the difference signal 62 as a function of $$\phi = \text{MOD}\ (n/2*\alpha - (n+1)/2*\beta + 45, 90*n)$$

where $\phi$ is the difference signal 62 and,
MOD is a function that returns the remainder after dividing (n/2*$\alpha$−(n+1)/2*$\beta$+45) by (90*n),
$\alpha$ is the first angle signal 54,
and $\beta$ is the second angle signal 58.

The difference signal 62 is indicative of the difference in phase between the first and second angle signals 54 and 58.

Position generator 64 is configured to generate the output signal 50 ($\sigma_M$) as a function of both the difference signal ($\phi$) 62, and the second angle signal ($\beta$) 58. In one embodiment, position generator 64 is configured to generate output signal 50 ($\sigma_M$) as follows:

$$\sigma_M = \frac{(180*(\text{CYCLE}-1)+\beta)}{180} * \frac{(n+1)}{2}$$

where $\sigma_M$ is the output absolute linear position signal (measured),
$\beta$ is the second angle signal 58,
and $\phi$ is the difference signal 62, and $$\text{CYCLE} = \frac{\varphi + 45}{90}.$$

Using the position of the second magnetic encoder strip 16 (i.e., the low frequency strip) and the difference signal ($\phi$) 62, the output signal 50 indicative of the absolute linear position can be determined with high accuracy. Providing further or more magnetic encoders can accomplish redundancy and/or can also provide for increased resolution.

FIGS. 3–6 show various plots of the signals at various stages of the processing.

Figure 3:
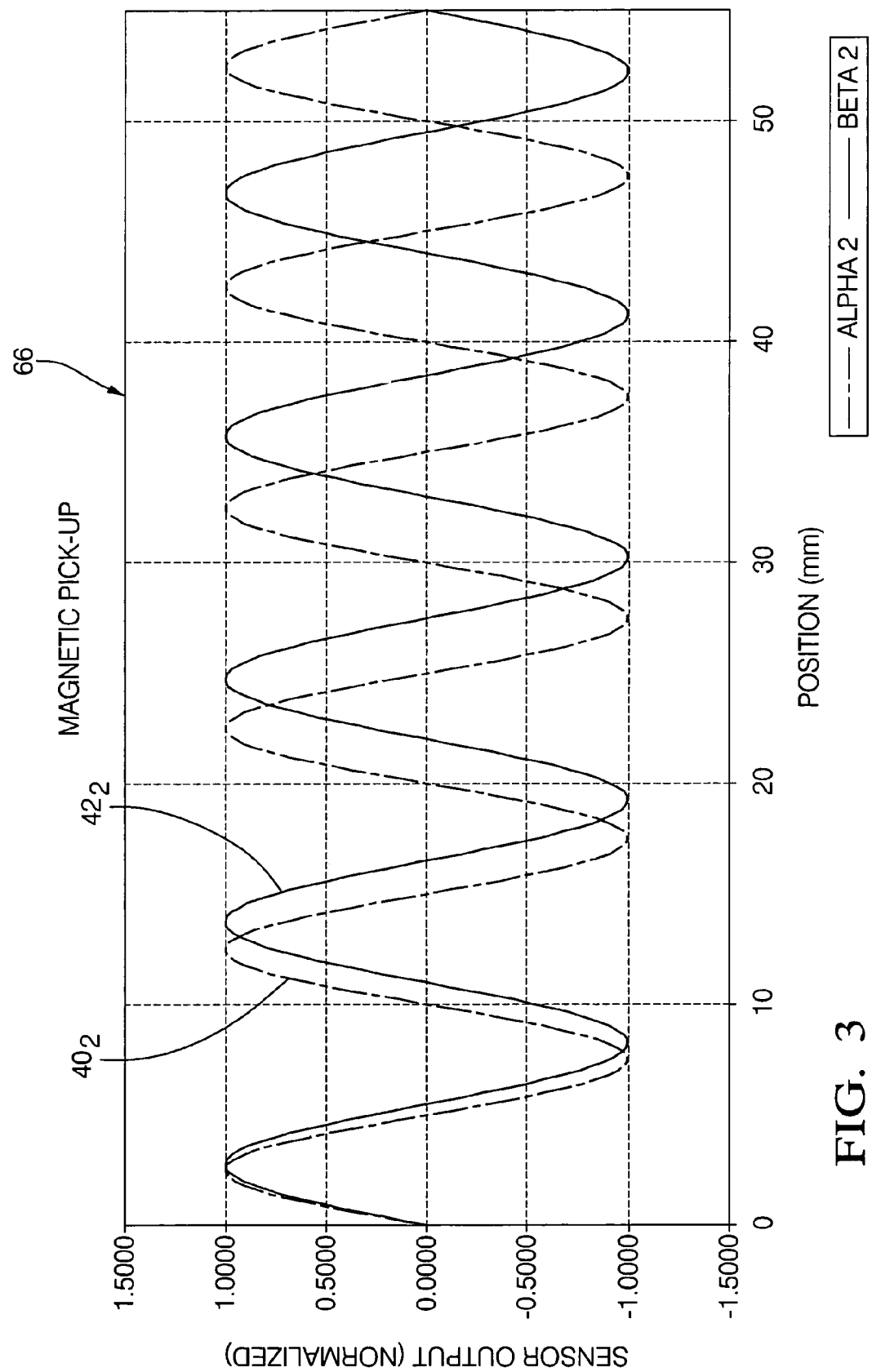
FIG. 3 is a plot of the sensing unit outputs as a function of position of a traveling body, showing in particular a phase difference between outputs indicative of absolute linear position.

Referring to FIG. 3, a plot 66 shows the outputs of the sensing unit 18, 20 as a function of the position of the traveling body 12. More particularly, FIG. 3 shows alpha position signal $40_2$ plotted with beta position signal $42_2$. Note that at position zero, corresponding to the left-most end 26 of the linear distance 30 (FIG. 1), the pole pairs on both encoders 14 and 16 are aligned. Accordingly, both signals in FIG. 3 converge at position 0 mm. However, as the position of the traveling body 12 increases (i.e., the traveling body 12 moves to the left in FIG. 1 wherein the encoder strips 14 and 16 move past the sensing units 18 and 20), the signals $40_2$ and $42_2$ begin to diverge and show a phase difference. This phase difference is due to the configuration of the encoder strips 14, 16 having (n+1) and (n) pole pairs, respectively.

Figure 4:
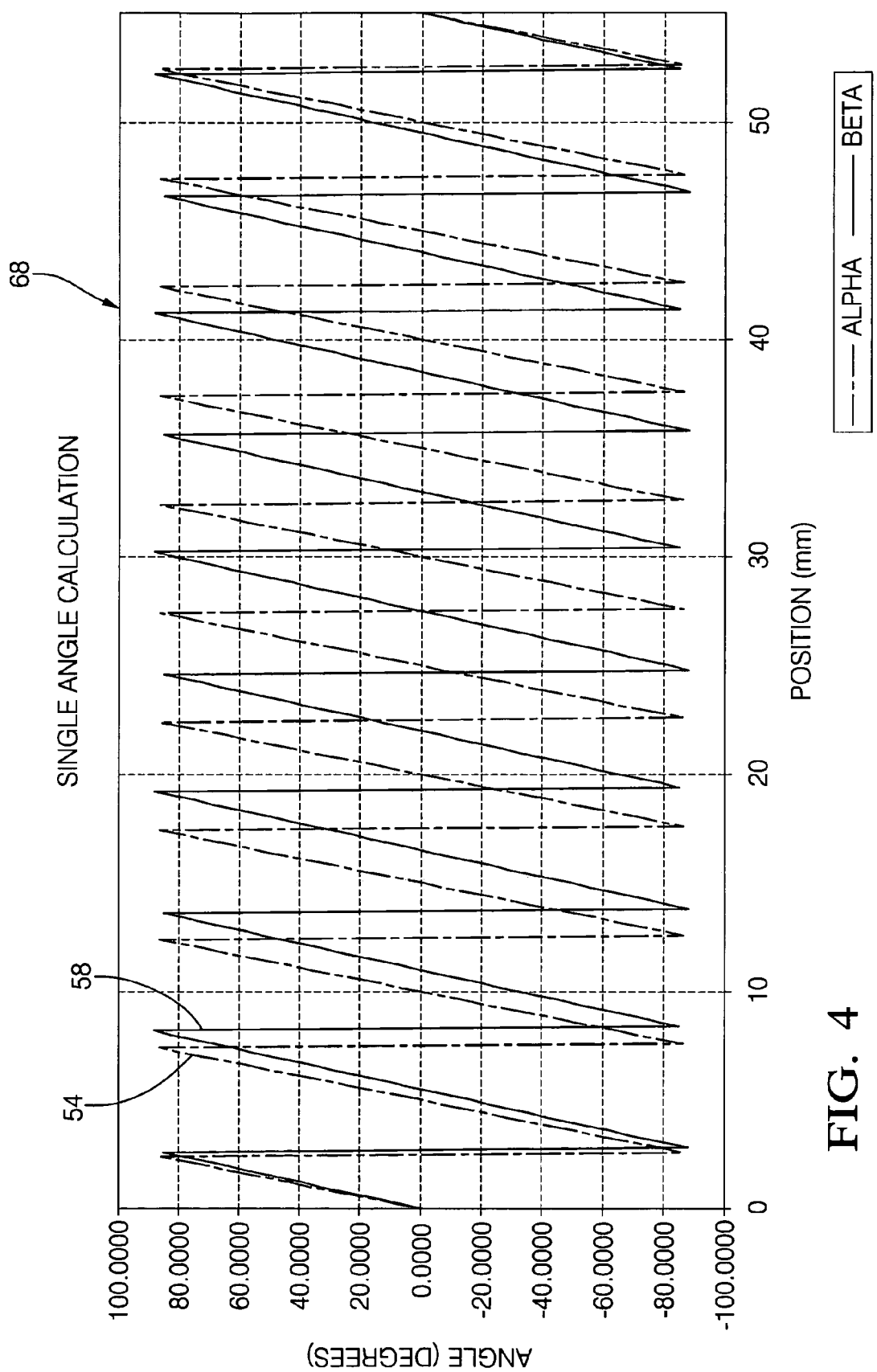
FIG. 4 is a plot showing angle signals as a function of position that are output from a pair of single-angle determining units as shown in FIG. 2.

FIG. 4 shows the outputs 54, 58 of the first and second single-angle determination units 52 and 56, respectively. Plot 68 in FIG. 4 shows first angle signal 54 and second angle signal 58, each of which is a composite signal obtained by de-phasing of the respective signal pairs generated by sensing units 18, 20. Note that FIG. 4 also shows a phase difference between the outputs of sensing units 18, 20 as the position of traveling body 12 increases from 0 mm. This phase difference, as described above, is indicative of the absolute linear position.

Figure 5:
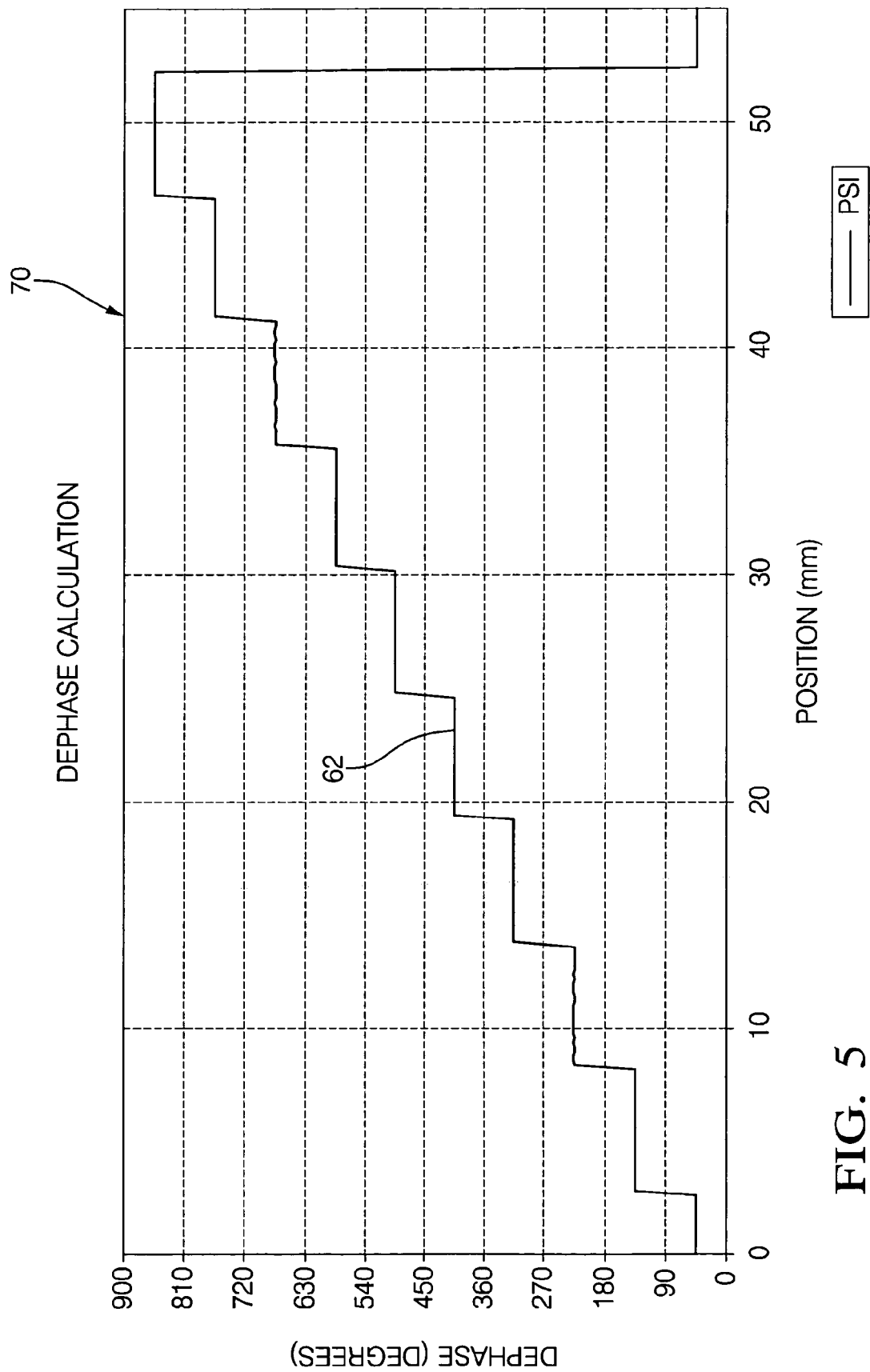
FIG. 5 is a plot showing a difference signal as a function of position produced from a dephaser block of the processor in FIG. 2.

FIG. 5 shows a plot 70, which illustrates the difference signal 62 (diphase value) that is output from de-phaser 60 as a function of position (mm). The difference signal 62 represents the difference in phase between the two single-angle signals 54 and 58.

Figure 6:
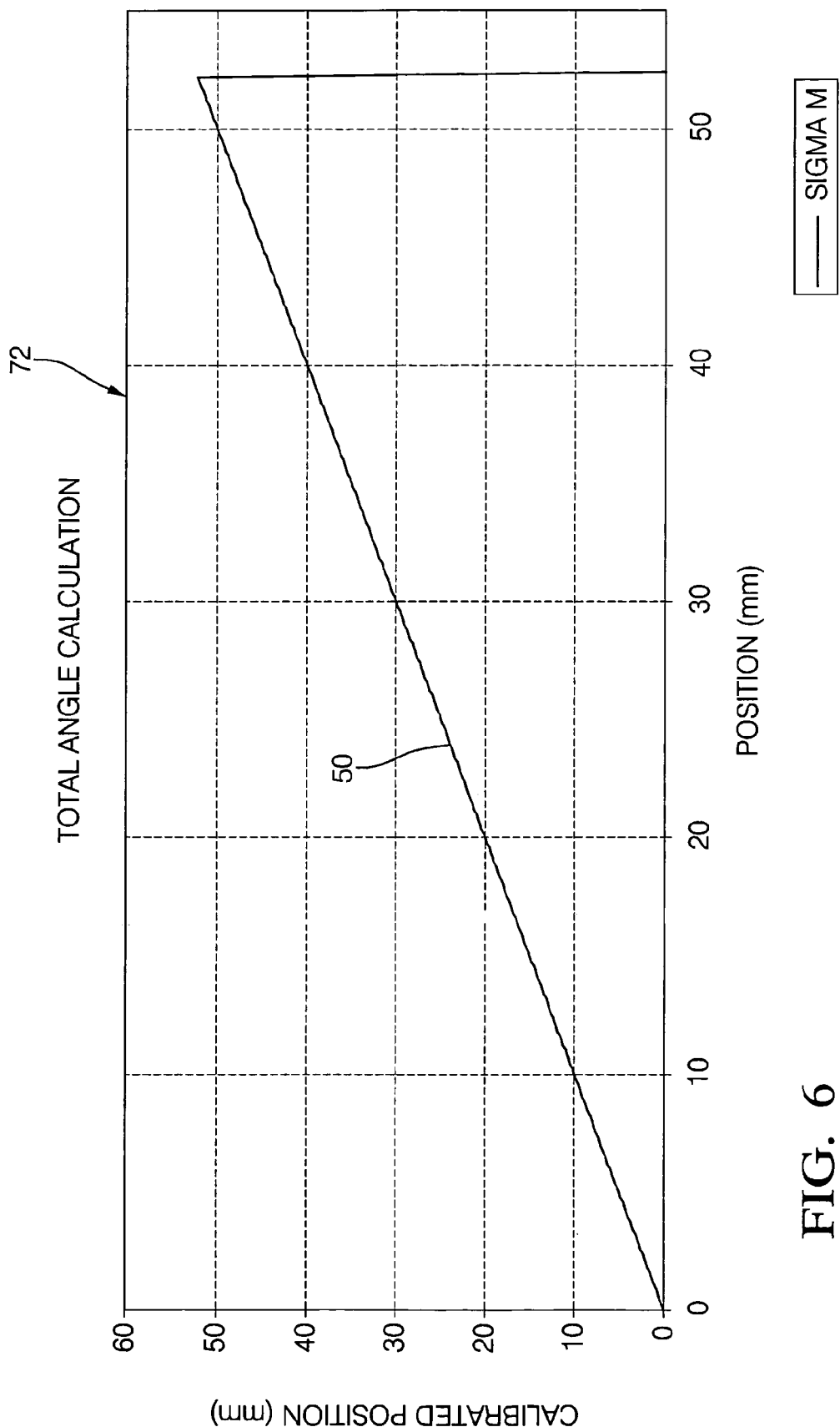
FIG. 6 is a plot showing an absolute linear position (measured) signal as a function of position (actual) produced from the processor in FIG. 2.

FIG. 6 shows a total angle calculation plot 72, which illustrates output signal 50 (measured position) as a function of actual position (mm). The output signal 50 ($\sigma_M$) is the measured absolute linear position that is indicative of the actual absolute linear position of the traveling body 12.

While the particular non-contact linear absolute position sensor system 10 as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled. For example, the present invention may be adapted to measure accurately the absolute angle of a rotational body (e.g., where there is no access to the center).

In one such alternate embodiment, tracks 14 and 16 are deployed to form a pair of concentric, closed, circle-shaped tracks, with one of the tracks having a greater diameter than the other one of the tracks. In this alternate embodiment, sensing units 18 and 20 are located near its corresponding track.

In a still further embodiment, tracks 14 and 16 are deployed to form a pair of closed, circle-shaped tracks but in which the tracks are offset axially from each other. For example, such tracks may be deployed on an outer surface of a rotating cylinder shaped component. The tracks 14, 16 would thus have about the same diameter (i.e., the diameter of the cylinder), but offset from each other. The sensing units 18, 20 are located near its corresponding track.

These two alternate examples show the use of the present invention to measure an absolute angle of a rotating body. It should be understood that the scope of the present invention is limited only by the appended claims.

The invention claimed is:

1. A sensor system comprising:
a first magnetic encoder having n+1 pole pairs where n is an integer greater than or equal to one;
a second magnetic encoder having n pole pairs positioned proximate said first encoder and aligned therewith so as to cover a linear distance;
first and second magnetic flux intensity sensing units located proximate said first and second magnetic encoders and in sensing relation therewith configured to generate respective linear position signals;
a processor responsive to said linear position signals configured to generate an output signal indicative of an absolute linear position;
wherein said first sensing unit comprises a first pair of Hall Effect sensors associated with said first magnetic encoder separated by half a pole distance, said second sensing unit comprises a second pair of Hall Effect sensors associated with said second magnetic encoder separated by half a pole distance, said first and second pairs of Hall Effect sensors generating said linear position signals.

2. A sensor system comprising:
a first magnetic encoder having n+1 pole pairs where n is an integer greater than or equal to one;
a second magnetic encoder having n pole pairs positioned proximate said first encoder and aligned therewith so as to cover a linear distance;
first and second magnetic flux intensity sensing units located proximate said first and second magnetic encoders and in sensing relation therewith configured to generate respective linear position signals;
a processor responsive to said linear position signals configured to generate an output signal indicative of an absolute linear position;
wherein said first sensing unit comprises a first pair of Hall Effect sensors associated with said first magnetic encoder separated by half a pole distance, said second sensing unit comprises a second pair of Hall Effect sensors associated with said second magnetic encoder separated by half a pole distance, said first and second pairs of Hall Effect sensors generating said linear position signals, and wherein said processor includes:
a first single-angle determination unit responsive to said linear position signals configured to generate a first angle signal indicative of the position of said first sensing unit within one of said n+1 pole pairs in said first magnetic encoder;
a second single-angle determination unit responsive to said linear position signals configured to generate a second angle signal indicative of the position of said second sensing unit within of said n pole pairs in said second magnetic encoder;
a dephaser responsive to said first and second angle signals configured to generate a difference signal indicative of the difference between said first and second angle signals; and
a position generator responsive to said difference signal and said second angle signal configured to generate said output signal indicative of said absolute position within said linear distance.

3. The system of claim 2 wherein said linear position signals comprise first and second linear position signals from said first pair of Hall Effect sensors and third and fourth linear position signals from said second pair of Hall Effect sensors, and wherein said first angle signal is defined as a function of $$\alpha = A\ TAN\ (\alpha 2/\alpha 1)$$

where α is said first angle signal,
α1 is said first linear position signal,
α2 is said second linear position signal, and wherein said second angle signal is defined as a function of $$\beta = A\ TAN\ (\beta 2/\beta 1)$$

where β is said second angle signal,
β1 is said third linear position signal,
β2 is said fourth linear position signal.

4. The system of claim 3 wherein said dephaser is configured to generate said difference signal as a function of $$\phi = MOD\ (n/2*\alpha - (n+1)/2*\beta + 45,\ 90*n)$$

where ϕ is said difference signal,

MOD is a function that returns the remainder after dividing $(n/2*\alpha-(n+1)/2*\beta+45)$ by $(90*n)$.

5. The system of claim 2 wherein said output signal is generated by said position generator as a function of $$\sigma M = f(\phi, \beta)$$

where σM is the absolute linear position,
φ is said difference signal, and
β is said second angle signal.

6. The system of claim 2 further including m magnetic encoders where m=1 or higher, and m magnetic flux intensity sensing units.

7. An absolute linear position sensor system for a traveling body comprising:
- a first magnetic encoder having n+1 pole pairs where n is an integer greater than or equal to one;
- a second magnetic encoder having n pole pairs positioned proximate said first encoder and aligned therewith at respective ends and extending in a coextensive fashion over a linear distance, said first and second encoders being configured for movement together with the traveling body;
- first and second magnetic flux intensity sensing units located proximate said first and second magnetic encoders and in sensing relation therewith configured to generate respective linear position signals, wherein said first sensing unit comprises a first pair of Hall Effect sensors associated with said first magnetic encoder separated by half a pole distance, said second sensing unit comprises a second pair of Hall Effect sensors associated with said second magnetic encoder separated by half a pole distance, said first and second pairs of Hall Effect sensors generating said linear position signals;
- a processor responsive to said linear position signals configured to generate an output signal indicative of an absolute linear position of said traveling body.

8. An absolute linear position sensor system for a traveling body comprising:
- a first magnetic encoder having n+1 pole pairs where n is an integer greater than or equal to one;
- a second magnetic encoder having n pole pairs positioned proximate said first encoder and aligned therewith at respective ends and extending in a coextensive fashion over a linear distance, said first and second encoders being configured for movement together with the traveling body;
- first and second magnetic flux intensity sensing units located proximate said first and second magnetic encoders and in sensing relation therewith configured to generate respective linear position signals, wherein said first sensing unit comprises a first pair of Hall Effect sensors associated with said first magnetic encoder separated by half a pole distance, said second sensing unit comprises a second pair of Hall Effect sensors associated with said second magnetic encoder separated by half a pole distance, said first and second pairs of Hall Effect sensors generating said linear position signals;
- a processor responsive to said linear position signals configured to generate an output signal indicative of an absolute linear position of said traveling body wherein said processor includes:
  - a first single-angle determination unit responsive to said linear position signals configured to generate a first angle signal indicative of the position of said first sensing unit within one of said n pole pairs in said first magnetic encoder;
  - a second single-angle determination unit responsive to said linear position signals configured to generate a second angle signal indicative of the position of said second sensing unit within of said n pole pairs in said second magnetic encoder;
  - a dephaser responsive to said first and second angle signals configured to generate a difference signal indicative of the difference between said first and second angle signals; and
  - a position generator responsive to said difference signal and said second angle signal configured to generate said output signal indicative of said absolute linear position.

* * * * *